United States Patent
Yuki et al.

(10) Patent No.: US 8,293,160 B2
(45) Date of Patent: Oct. 23, 2012

(54) BIAXIALLY STRETCHED POLYAMIDE RESIN FILM, AND PROCESS FOR PRODUCTION THEREOF

(75) Inventors: Kiwamu Yuki, Kyoto (JP); Makoto Nakai, Kyoto (JP); Atsuko Noda, Kyoto (JP)

(73) Assignee: Unitika Ltd., Hyogo (JP)

( * ) Notice: Subject to any disclaimer, the term of this patent is extended or adjusted under 35 U.S.C. 154(b) by 0 days.

(21) Appl. No.: 12/921,850

(22) PCT Filed: Apr. 15, 2009

(86) PCT No.: PCT/JP2009/001729
§ 371 (c)(1),
(2), (4) Date: Sep. 10, 2010

(87) PCT Pub. No.: WO2009/128261
PCT Pub. Date: Oct. 22, 2009

(65) Prior Publication Data
US 2011/0021719 A1    Jan. 27, 2011

(30) Foreign Application Priority Data
Apr. 16, 2008    (JP) ................... 2008-106275

(51) Int. Cl.
*B32B 27/34* (2006.01)
*B29C 55/12* (2006.01)
*C08L 77/00* (2006.01)

(52) U.S. Cl. ............. 264/288.4; 264/289.3; 264/289.6; 264/290.2; 264/291; 428/220; 428/910; 525/432

(58) Field of Classification Search ............. 264/288.4, 264/289.3, 289.6, 290.2, 291; 428/220, 910
See application file for complete search history.

(56) References Cited

U.S. PATENT DOCUMENTS

| | | | |
|---|---|---|---|
| 6,169,161 B1 * | 1/2001 | Tachibana et al. | 528/310 |
| 6,297,345 B1 * | 10/2001 | Okushita et al. | 528/170 |
| 2003/0023028 A1 * | 1/2003 | Tanaka et al. | 528/310 |

FOREIGN PATENT DOCUMENTS

| | | |
|---|---|---|
| JP | 04-325159 | 11/1992 |
| JP | 10-219104 | 8/1998 |
| JP | 2000-211022 | 8/2000 |
| JP | 2000-233442 | 8/2000 |
| JP | 2000-318036 | 11/2000 |
| JP | 2001-081189 | 3/2001 |
| JP | 2001-113596 | 4/2001 |
| JP | 2001-328681 | 11/2001 |
| JP | 2005-111791 | 4/2005 |
| JP | 2005-187665 | 7/2005 |
| WO | 2008/075461 | 6/2008 |

* cited by examiner

*Primary Examiner* — Ana Woodward
(74) *Attorney, Agent, or Firm* — Fildes & Outland, P.C.

(57) ABSTRACT

At an optional stage in the production step of a biaxially stretched film using a polyamide resin including, as a first component, nylon 6, and as a second component, a polyamide including xylylenediamine and an aliphatic dicarboxylic acid having 4 to 12 carbon atoms, the film is brought into contact with water set at 40° C. or higher and lower than 70° C. for 1 to 10 minutes and further with water set at 70° C. or higher for 1 to 10 minutes. In the film thus obtained, the content of low molecular weight compounds is 0% by mass to 0.2% by mass.

2 Claims, No Drawings

1

BIAXIALLY STRETCHED POLYAMIDE RESIN FILM, AND PROCESS FOR PRODUCTION THEREOF

TECHNICAL FIELD

The present invention relates to a biaxially stretched polyamide resin film and a process for producing thereof, in particular, a biaxially stretched polyamide resin film usable for packages and containers made of a polyamide resin and a process for producing the biaxially stretched polyamide resin film.

BACKGROUND ART

Biaxially stretched polyamide resin films using polyamides such as nylon 6 and nylon 66 are excellent in the mechanical properties such as tensile strength, sticking strength, pinhole strength and impact-resistant strength, and additionally, in gas-barrier property and heat resistance. Accordingly, these films are used in wide applications.

When these biaxially stretched polyamide resin films are used as packaging materials, these biaxially stretched polyamide resin films are usually used as front substrates of laminated films, and are in many cases free from direct contact with contents as the packaged articles. Accordingly, the behavior of the low molecular weight compounds in the biaxially stretched polyamide resin films has not been much mentioned yet.

However, when the films are heated in the production step thereof or in the processing step such as a step of laminating or printing, the low molecular weight compounds contained in the polyamide resin films are deposited on the surface of the films as the case may be. As the current packaging techniques are sophisticated, this phenomenon comes to be an issue impossible to be left out of consideration because troubles, for example, ascribable to this phenomenon are caused.

For the purpose of coping with the issue, there have been proposed polyamide resins, in each of which the molecular weight of the constituent monomer unit is large, such as nylon 11 and nylon 12 or copolyamide resins mainly composed of nylon 11 and nylon 12 (JP4-325159A). Alternatively, a copolymerized polyamide resin between 1,6-hexanediamine and sebacic acid has also been proposed (JP2001-328681A). However, these are specific polyamides, and are high in price and low in versatility. Consequently, strongly demanded are films in which highly versatile nylon 6 and nylon 66 are used and the monomer contents are low.

Even if the low molecular weight compounds such as the unreacted monomers and oligomers are removed from a polyamide resin at the stage of being chips prior to film molding, remelting of the resin chips with a melt extruder or the like regenerates the low molecular weight compounds, and consequently the low molecular weight compounds remain in the film to degrade the quality of the film. In particular, a polyamide in which caproamide is the main repeating unit thereof has a characteristic that the low molecular weight compounds such as the monomers tend to be more easily generated than in polyamides formed of a dicarboxylic acid and a diamine and the content of the low molecular weight compounds is large.

In general, when the terminal group concentration of a polyamide resin is higher, the regeneration amount of the low molecular weight compounds such as the monomers at the time of remelting tends to be larger. For the purpose of coping with this problem, there has been developed a polyamide in which a compound capable of reacting with the carboxyl terminals or the amino terminals of the polyamide is added. Specifically, there has been proposed a method in which an organic glycidyl ester is reacted with the carboxyl groups and the amino groups of the polyamide (JP10-219104A). However, in this method, when the organic glycidyl ester and the polyamide chips are dry blended and then melt-kneaded in an extruder, the organic glycidyl ester is allowed to react with the terminal groups of the polyamide. Additionally, in this method, it is difficult to perform uniform mixing in the dry blending step prior to film molding. Consequently, such non-uniform mixing offers a cause for the composition variation. Thus, it is difficult to obtain a polyamide having a uniform terminal group concentration, and moreover, the dry blending step itself is unsuitable for films involving large melt extrusion amounts. Additionally, in this method, the content of the low molecular weight compounds after the melt molding is still large, and the reduction amount of the low molecular weight compounds is not sufficient.

On the other hand, there has been proposed a method in which the terminal amino groups of a polyamide resin are blocked with a dicarboxylic acid anhydride (JP2005-187665A). However, the amount of the regenerated monomers at the time of melting is still as large as 0.27 to 0.75% by mass, and it is difficult to sufficiently reduce the amount of the low molecular weight compounds contained in the polyamide resin film.

Additionally, there has been proposed a nylon 6 resin in which a piperidone compound is chemically bonded to the polymer chain or the terminals of the polymer (JP2001-081189A). In this resin, the generation of caprolactam resulting from the melting under a reduced pressure is reduced. However, in the film formation step generally performed under normal pressure, the oligomers generated when the resin is melted are hardly discharged to outside the system, and hence the oligomer reduction effect is insufficient.

As described above, with respect to the low molecular weight compounds of the polyamide resin, various proposals have been offered. However, no documents have mentioned the low molecular weight compounds in the nylon products including a polyamide (nylon MXD) composed of xylylenediamine and an aliphatic dicarboxylic acid having 4 to 12 carbon atoms.

In particular, films formed of a blend resin composed of nylon 6 or nylon 66 and nylon MXD, or films having a multilayer lamination configuration constituted with nylon 6 or nylon 66 and nylon MXD are capable of imparting additional functionalities to a film formed of nylon 6 resin or nylon 66 resin, and hence, under the circumstances as described above, such films have come to be widely used as gas-barrier films, straight-cut films, easy-tear films, contractive films and the like.

However, nylon MXD-containing films are abundant in the content of the low molecular weight compounds, and hence cause problems in the production step or the processing step. Such films are larger in the amounts of the low molecular weight compounds deposited outside the films as compared to, for example, nylon 6 resin films, and hence are strongly required to be improved for such deposition.

As a countermeasure against the deposition of the low molecular weight compounds, WO 2008/075461A1 by the present applicants proposes, with respect to the nylon 6 resin, a method for efficiently removing the low molecular weight compounds such as monomers by using heated water. However, this method is unable to effectively remove the low molecular weight compounds from products made of nylon MXD-containing nylon resins.

SUMMARY OF THE INVENTION

Problems to be Solved by the Invention

The present invention solves such problems as described above, and an object of the present invention is to provide a nylon MXD-containing biaxially stretched polyamide resin film which allows drastic reduction of the contents of the low molecular weight compounds in the film without impairing the intrinsic excellent properties of the film, hence is free from an adverse possibility of the occurrence of troubles in the film production step and the film processing step, is excellent in production efficiency and performances and is usable for packaging materials and containers made of polyamide resin, and to provide a process for producing the nylon MXD-containing biaxially stretched polyamide resin film.

Means for Solving the Problems

For the purpose of achieving the above-described object, the biaxially stretched polyamide resin film of the present invention includes, as a first component, nylon 6, and as a second component, a polyamide including xylylenediamine and an aliphatic dicarboxylic acid having 4 to 12 carbon atoms, and in the biaxially stretched polyamide resin film, the content of the low molecular weight compounds is 0% by mass to 0.2% by mass.

In the process for producing a biaxially stretched polyamide resin film of the present invention, at an optional stage in the production step of a biaxially stretched film using a polyamide resin including, as a first component, nylon 6, and as a second component, a polyamide including xylylenediamine and an aliphatic dicarboxylic acid having 4 to 12 carbon atoms, the film is brought into contact with water set at 40° C. or higher and lower than 70° C. for 1 to 10 minutes and further with water set at 70° C. or higher for 1 to 10 minutes.

Advantages of the Invention

According to the present invention, application of a low molecular weight compound removal step to a nylon MXD-containing polyamide resin film enables to drastically reduce the content of the low molecular weight compounds in the film without impairing the intrinsic excellent properties of the polyamide resin film. Consequently, it is possible to obtain a biaxially stretched polyamide resin film high in production efficiency, excellent in performances and usable for packages and containers made of a polyamide resin.

DETAILED DESCRIPTION OF THE INVENTION

Hereinafter, the present invention is described in detail.

The biaxially stretched polyamide resin film of the present invention includes, as a first component, nylon 6, and as a second component, a polyamide (nylon MXD) including xylylenediamine and an aliphatic dicarboxylic acid having 4 to 12 carbon atoms, and is obtained by being subjected to biaxial stretching.

The composition ratio between the first component and the second component of the resin that forms the film is preferably such that the ratio of first component/second component=95/5 to 30/70 in terms of mass ratio. When the proportion of the first component exceeds 95% by mass, the various properties originating from the second component, such as barrier property and flexibility are not developed or developed barely even if developed, and thus it is difficult to obtain the effect of the addition of the second component. Conversely, when the proportion of the first component is less than 30% by mass, adverse effects tend to occur, for example, in such a way that the toughness characteristic of nylon 6 as the first component is remarkably impaired.

In the biaxially stretched polyamide resin film of the present invention, the content of the low molecular weight compounds is required to be 0% by mass to 0.2% by mass, and is preferably 0% by mass to 0.1% by mass, more preferably 0% by mass to 0.05% by mass or less and most preferably 0% by mass; in other words, absolutely no inclusion of the low molecular weight compounds is most preferable.

When the content of the low molecular weight compounds exceeds 0.2% by mass, the heating of the concerned polyamide resin film results in the deposition of the oligomers as the low molecular weight compounds on the surface of the film. Consequently, various problems are caused in the steps such as the production step and the processing step. For example, when the amount of the deposited low molecular weight compounds is large, for the purpose of preventing the troubles caused by the large deposition amount, the low molecular weight compounds adhering to the production machine or the processing machine have to be removed. For that purpose, the production activities or the processing activities are required to be halted, and thus the production efficiency is remarkably affected.

The smaller is the content of the low molecular weight compounds, the better; however, with the decrease of the content of the low molecular weight compounds, the time required for the low molecular weight compound removal step at the time of the film formation is increased, and hence the productivity tends to be degraded. Therefore, actually the lower limit of the content of the low molecular weight compounds is approximately 0.001% by mass.

In the present invention, the content of the low molecular weight compounds in the polyamide resin film can be calculated by the following measurement method. Specifically, about 0.5 g (in terms of the polyamide resin) of a film cut to an about 0.5-cm square specimen is precisely weighed, the specimen is subjected to an extraction with 10 ml of distilled water in a boiling water bath (100° C.) for 2 hours, and for the obtained extraction solution, the content of the low molecular weight compounds in the film is determined by liquid chromatography (for example, with HP 100 HPLC system, manufactured by Hewlett-Packard Company). The more specific techniques for this determination are described below.

In the above-described measurement, it has been verified that the low molecular weight compounds detected in the case of a nylon 6 resin film are mainly the caprolactam monomer and dimer, the low molecular weight compounds detected in the case of a blend film composed of nylon 6 and nylon MXD or a laminated film composed of a nylon 6 film and a nylon MXD film are not restricted to the caprolactam monomer and dimer. The low molecular weight compounds as referred to in the present invention mean the components included in the peak at the same elution time as the elution time of the caprolactam monomer when the low molecular weight compounds such as a monomer and a dimmer in a nylon 6 resin are measured by HPLC.

According to the experiment performed by the present inventors, the low molecular weight compounds contained in a film of a blend film composed of nylon 6 and nylon MXD or a laminated film composed of a nylon 6 film and a nylon MXD film were extracted and concentrated, and analyzed by IR (infrared spectroscopy) or NMR (nuclear magnetic resonance); and consequently, a peak originating from meta-xylylenediamine was detected from the extracted low molecular weight compounds. Additionally, the presence of a plurality of substances was identified by mass spectrometry in a range approximately from 50 to 300 for the molecular weights of the low molecular weight components. Thus, it has been found that in the polyamide resins including nylon 6 and nylon MXD, the components including meta-xylylenediamine as well as the caprolactam monomer and dimer are present as the low molecular weight components. It is presumed that the removal of the low molecular weight components other than caprolactam requires a removal treatment performed at a high temperature and for a long time.

The biaxially stretched polyamide resin film of the present invention can be formed as a laminated film. The details for such a laminated film are as follows.

For example, in a dry laminating method, a stretched film made of another resin and/or a sealant made of another resin is bonded by using an adhesive to the biaxially stretched polyamide resin film to form a laminated film suitable for a packaging material. Additionally, in an extrusion method, a laminated film suitable for a packaging material can be obtained as follows: a resin in a molten state is, once or two or more times, extruded onto and laminated on the surface of the biaxially stretched polyamide resin film; or alternatively, when a resin is extruded, the extruded resin is used as a substitute for an adhesive and thus the film and another film are bonded to each other.

The biaxially stretched polyamide resin film of the present invention includes nylon 6 and nylon MXD as the main components thereof, but may also include nylon 66, nylon 46, nylon 69, nylon 610, nylon 612, nylon 11, nylon 12 and polymetaxylylene adipamide (nylon MXD6) and the like in appropriate amounts in the forms of blended substances, copolymers and composite substances.

More preferably, for the purpose of suppressing the generation of the low molecular weight compounds at the time of melting, the polyamide resins constituting the biaxially stretched film include, as terminal blocking agents, an organic glycidyl ester, a dicarboxylic acid anhydride, a monocarboxylic acid such as benzoic acid, a diamine and the like.

The relative viscosity of each of the polyamide resins constituting the biaxially stretched film is not particularly limited; however, the relative viscosity measured under the conditions that 96% sulfuric acid is used as a solvent, the measurement temperature is 25° C. and the concentration is 1 g/dl is preferably within a range from 1.5 to 5.0, more preferably from 2.5 to 4.5 and furthermore preferably from 3.0 to 4.0. When the relative viscosity of the polyamide resin is less than 1.5, the mechanical properties of the film tend to be remarkably degraded. When the relative viscosity of the polyamide resin exceeds 5.0, the film formability tends to be disturbed.

The polyamide resins constituting the biaxially stretched film may contain, where necessary as added thereto within an extent not adversely affecting the performances of the film, one or two or more various additives such as a pigment, an antioxidant, an ultraviolet absorber, a preservative agent, an antistatic agent, an antiblocking agent and an inorganic fine particle.

For the purpose of improving the slipping property of the film and other purposes, the polyamide resins constituting the biaxially stretched film may also contain, as mixed therewith, one or more of various inorganic or organic lubricants. Examples of such lubricants include clay, talc, calcium carbonate, zinc carbonate, wollastnite, silica, alumina, magnesium oxide, calcium silicate, sodium aluminate, calcium aluminate, magnesium aluminosilicate, glass balloon, carbon black, zinc oxide, antimony trioxide, zeolite, hydrotalcite, layered silicates and ethylene-bis-stearic acid amide.

The process for producing a biaxially stretched polyamide resin film of the present invention is as follows.

The biaxially stretched polyamide resin film of the present invention is obtained, for example, as outlined as follows: a polyamide resin composition is heated to be melted with an extruder, extruded from a T-die in a form of a film, and solidified by cooling on a rotating cooling drum by applying a known casting method such as air knife casting or electrostatic casting to form an unstretched film; and the unstretched film is subjected to a stretching treatment to yield the intended biaxially stretched polyamide resin film. When two or more resins are mixed together at the time of melt extrusion, a resin blend film is obtained; when two or more resins are simultaneously extruded from separate nozzles for lamination at the time of melt extrusion, a multilayer film having two or more resin layers is obtained. When the unstretched film is oriented, the stretchability is degraded in a subsequent step as the case may be, and hence the unstretched film is preferably in a condition of substantially being amorphous or substantially being non-oriented.

The stretching method includes a successive biaxial stretching method in which longitudinal stretching is conducted and then a transverse stretching treatment is conducted, and a simultaneous biaxial stretching method in which a longitudinal stretching treatment and a transverse stretching treatment are conducted simultaneously. In either of these stretching methods, the stretching treatment is preferably conducted in such a way that the attained in-plane magnification is 9 or more in order to obtain an orientation coefficient of 0.05 or more.

The stretching method is not particularly limited; however, because of being efficient, preferable is the tenter-type biaxial stretching method which enables as one process to conduct a melt-film formation step and the below-described steps, namely, a preliminary heated-water treatment step, a low molecular weight compound removal step, a stretching step, a heat setting step and a cooling step.

The heat setting step is described as follows: a film having been subjected to a successive biaxial stretching or a simultaneous biaxial stretching is heat-fixed at temperatures of 150 to 220° C. in the tenter where the stretching treatment has been conducted, and where necessary, subjected to a relaxation treatment in the longitudinal direction and/or the transverse direction within a range from 0 to 10% and preferably from 2 to 6%.

The production of the biaxially stretched polyamide resin film of the present invention requires the low molecular weight compound removal step to be set at an optional stage in the above-described film formation step. Although the low molecular weight compound removal step is claimed to be set at an optional stage, the low molecular weight compound removal step is preferably conducted after melting the polyamide resin for forming into a film shape because the content of the low molecular weight compounds is increased by melting the polyamide resin. The low molecular weight compound removal step may be conducted at any of a stage of the unstretched film, a stage after the longitudinal stretching and a stage after the biaxial stretching; however, the low molecular weight compound removal step is preferably conducted at the stage of the unstretched film in which neither the crystallization nor the orientation of the film has yet proceeded appreciably, because the efficiency of the low molecular weight compound removal is satisfactory at such a stage and no low molecular weight compounds are discharged into the air during the stretching step.

As described above, WO 2008/075461A1 by the present applicants proposes, with respect to the nylon 6 resin, a method for efficiently removing the low molecular weight compounds such as monomers by using heated water. However, a nylon resin film including nylon 6 and nylon MXD is larger in the content of low molecular weight compounds as compared to the nylon 6 resin film, and hence the treatment described in WO 2008/075461A1 alone attains a smaller effect in reducing the amount of the low molecular weight compounds. Additionally, in the case of the nylon resin film including nylon 6 and nylon MXD, when the temperature of the heated water is low, the extraction efficiency of the low molecular weight substances is low. When the temperature of the heated water is increased as a countermeasure against this low extraction efficiency, the film undergoes wrinkling or sagging to disturb the film production.

Accordingly, the present invention reduces the amount of the low molecular weight compounds in the film without disturbing the production step by performing a preliminary treatment in a first water vessel and by successively using a second water vessel set at a higher temperature. Specifically, in the low molecular weight compound removal step based on the present invention, the polyamide resin film is brought into contact, under tension, with water set at 40° C. or higher and lower than 70° C. for 1 to 10 minutes as a preliminary treatment, and successively with heated water set at a temperature equal to or higher than 70° C. for 1 to 10 minutes.

In the low molecular weight compound removal step, the water temperature in the first water vessel as the preliminary heated-water treatment vessel is required to be 40° C. or higher and lower than 70° C., and is preferably 50° C. or higher and lower than 70° C. and more preferably 60° C. or higher and lower than 70° C. The water temperature in the second water vessel is required to be 70° C. or higher. When the water temperature in the second water vessel is lower than 70° C., it is difficult to remove the low molecular weight compounds in a short time. Additionally, when a treatment is performed in the first water vessel with hot water set at 70° C. or higher, in a case where the treatment is conducted at the stage of the unstretched film, the unstretched film tends to undergo wrinkling, and hence the stretching becomes non-uniform to degrade the quality of the stretched film; and additionally, operability is degraded such that troubles, at the time of stretching, such as the film breaking and the failure in gripping the film ends tend to occur.

The pH of the water in each of the first water vessel and the second water vessel is preferably 6.5 to 9.0, more preferably 7.0 to 8.5 and particularly preferably 7.5 to 8.0. When the pH is less than 6.5, the oxidation degradation of the polyamide resin film is allowed to proceed. When the pH exceeds 9.0, alkaline water attaches to the film and such water tends to attach to the worker unfavorably from the safety viewpoint.

In general, for the purpose of removing the low molecular weight compounds, the higher water temperature is effective; however, when the water temperature is high, the unstretched film tends to undergo wrinkling. When the water temperature is set at low temperatures, the removal of the low molecular weight compounds takes time to degrade the productivity. On the contrary, by performing a preliminary treatment in the first water vessel as in the present invention, the low molecular weight compounds to cause problems can be removed without causing, in the second water vessel set at a higher temperature wrinkling or sagging which degrades the productivity.

In the case where stretching is conducted after the low molecular weight compound removal step, for the purpose of avoiding troubles at the time of stretching, preferably the unstretched polyamide resin film is treated, after the low molecular weight compound removal step, in a water content regulation step in such a way that the water content of the polyamide resin film is regulated to be 1 to 10% by mass, preferably, 4 to 8% by mass, and then the stretching is conducted. When the water content is lower than 1% by mass, the stretching stress is increased and accordingly tends to cause troubles such as film breaking. Conversely, when the water content is higher than 10% by mass, the thickness unevenness of the unstretched film becomes large, and the thickness unevenness of the obtained stretched film also tends to be large.

After the treatment in the second water vessel set at a high temperature, the water content of the film is usually high. Therefore, the water content of the film is preferably decreased by bringing the film into contact with a roll having a water absorbing layer or by blowing dry air to the film. Conversely, when the water content is low, the water content regulation can be performed by using a water content regulation vessel. Usually pure water is used in the water content regulation vessel. However, where necessary, the treatment liquid may be made to contain additives such as a dye, a surfactant and a plasticizer. The water content of the film may also be regulated by spraying water vapor to the film.

Various functionalities can be imparted to the biaxially stretched polyamide resin film of the present invention. The film may be subjected to an easy-adhesion treatment for the purpose of improving the adhesiveness to, for example, another film, an adhesive and ink, subjected to an antistatic treatment for suppressing the generation of static electricity, or subjected to application of various functional coating liquids such as a barrier coating liquid for improving the barrier property. The coating method for that purpose is not particularly limited; there may be adopted methods such as a gravure roll coating method, a reverse roll coating method, an air knife coating method, a reverse gravure coating method, a meyer bar coating method and an inverse roll coating method, and various coating methods as combinations of these methods, and various spraying methods.

The thickness of the biaxially stretched polyamide resin film of the present invention is not particularly limited; however, the thickness concerned is preferably within a range from 10 μm to 30 μm when the film concerned is used for packaging purpose.

The biaxially stretched film thus obtained may be subjected, where necessary, to physicochemical treatments such as a corona discharge treatment, a plating treatment, a cleaning treatment, a dyeing treatment, a metal deposition treatment and various coating treatments.

The biaxially stretched polyamide resin film of the present invention can be used as a heat sealable packaging material by forming a laminated film through lamination with a sealant layer made of polyolefin or the like by using, for example, a dry laminating method or an extrusion laminating method.

EXAMPLES

The present invention is described in detail with reference to Examples. It is to be noted that the evaluation methods of the various physical properties in following Examples and Comparative Examples are as follows.

(1) Content of the Low Molecular Weight Compounds in a Film (Preparation of Measurement Sample)

About 0.5 g of a film cut to a 0.5-cm square was precisely weighed and placed in a 10-ml headspace vial; 10 ml of distilled water was added into the vial and the vial was hermetically sealed with a butyl rubber stopper and an aluminum cap; thereafter, extraction was conducted for 2 hours in a boiling water bath (100° C.); then, after cooling of the vial, filtration was conducted with a 0.45-μm disc filter to prepare a measurement sample.

(Calibration Curve)

Caprolactam was used as a reference substance for determination of the amount of the low molecular weight compounds. First, 0.1 g of caprolactam was dissolved in 100 ml of distilled water, and then the solution thus obtained was further diluted to prepare a 100-ppm standard solution. The standard solution was injected in amounts of 1 to 10 μl to obtain a calibration curves.

(HPLC Conditions)

Apparatus: HP 1100 HPLC system manufactured by Hewlett-Packard Company

Columns: Waters Puresil 5μ C18 20 nm (200 angstroms); 4.6 mm×250 mm (40° C.)

Detector: UV 210 nm

Elution was conducted for 12 minutes with an eluent of methanol/water (volume ratio)=35/75; then, the eluent was changed over to an eluent of methanol/water (volume ratio)=100/0 over a period of 3 minutes and elution was conducted for 30 minutes; and then, the eluent was further changed over to the eluent of methanol/water (volume ratio)=35/75 over a period of 5 minutes and elution was conducted for 20 minutes.

Flow rate: 0.7 ml/min

Injection volume: 10 μl (50 μl for low concentrations)

Detection limit: 3 ppm (Calculation Method)

Under the above-described conditions, the concentration of the low molecular weight compounds in the sample was obtained; from the concentration, the mass of the low molecular weight compounds in the sample was calculated; and the mass obtained was divided by the mass of the film to obtain the content (% by mass) of the low molecular weight compounds.

(2) Thickness Unevenness

By using a β-ray transmission thickness gauge (Model TG-220, manufactured by Fuji Electric Co., Ltd.), the thickness was measured across the width every 10 cm along the widthwise direction of a 300-cm wide stretched film, and the value represented by the following formula was defined as the thickness unevenness; and the thickness unevenness was evaluated from the value thus obtained on the basis of the following three grades, "G (Good), A (Average), P (Poor)," wherein the thickness unevenness values of 15% or less, namely, the grades of "G" and "A," were determined as passing.

Thickness unevenness=(Maximum thickness along the widthwise direction−minimum thickness along the widthwise direction)÷average thickness×100

G (Good): The thickness unevenness is 10% or less.

A (Average): The thickness unevenness exceeds 10% and is 15% or less.

P (Poor): The thickness unevenness exceeds 15%.

(3) Operability

By visually observing the condition of an unstretched film while the unstretched film is passing though a heated-water vessel, the occurrence conditions of wrinkles, meandering and the like were evaluated. The case where wrinkles, meandering and the like did not occur was evaluated as good to be marked with "G." The case where wrinkles, meandering and the like occurred was evaluated as poor to be marked with "P."

The materials used in following Examples and Comparative Examples are as follows.

(Nylon 6)

In a hermetically sealed reaction vessel equipped with a stirrer, 100 parts by mass of ε-caprolactam, 0.12 part by mass (10 mmol/kg in relation to ε-caprolactam) of benzoic acid and 3 parts by mass of water were placed, increased in temperature and allowed to undergo polycondensation reaction under a positive pressure of 0.5 MPa at a temperature of 260° C. The reaction product thus obtained was dispensed from the reaction vessel and then cut into chip shape. The chip-shaped product was further refined and dried to yield a nylon 6 resin chip. In this chip, the terminal carboxyl group amount was found to be 46 mmol/kg, the terminal amino group amount was found to be 36 mmol/kg and the relative viscosity was found to be 3.03.

(Master Chip)

A master chip was prepared by melt-mixing 6 parts by mass of silica (Syloid SY-150, manufactured by Mizusawa Industrial Chemicals, Ltd.) with 100 parts by mass of the nylon 6 resin.

(Nylon MXD)

A commercially available chip of a resin, namely, "MX Nylon 6007 (manufactured by Mitsubishi Gas Chemical Company, Inc., including xylylenediamine and adipic acid which is an aliphatic dicarboxylic acid having 6 carbon atoms) was used.

Example 1

Nylon 6 resin and the above-described master chip were blended with each other so as for the mixing proportion of silica to be 0.05% by mass, to yield a nylon 6 resin chip. This nylon 6 resin chip and the nylon MXD resin chip were mixed with each other in a mass ratio of nylon 6 resin chip/nylon MXD resin chip=80/20, and the obtained mixture was placed in an extruder of 65 mm in diameter, equipped with a coat hanger T-die. Then, the mixture was melted in a cylinder heated to a temperature of 270° C., and the obtained melt was extruded and rapidly cooled by bringing the extruded melt into close contact with a rotating drum cooled to 20° C. to yield a 160-μm-thick unstretched film.

The unstretched film was guided into a preliminary heated-water treatment vessel set at a water temperature of 60° C. as the first heated-water vessel, and was immersed in the water for 1 minute as a preliminary heated-water treatment step. Then, the unstretched film was guided into a hot-water treatment vessel set at a water temperature of 90° C. as the second heated-water vessel, and was immersed in the water for 1 minute as a low molecular weight compound removal step. The water-absorbed unstretched film was guided into a simultaneous biaxial stretching machine and subjected to a simultaneous biaxial stretching with a longitudinal magnification factor of 3.3× and a transverse magnification factor of 3.3×. Successively, the stretched film was heat treated at a temperature of 210° C., to thereby perform a 5% transverse relaxation treatment, and thus a 15-μm thick biaxially stretched polyamide resin film was obtained. The content of the low molecular weight compounds, the thickness unevenness and the operability of the obtained biaxially stretched polyamide resin film were evaluated, and the results thus obtained are shown in Table 1.

TABLE 1

| | Film type | Nylon 6/ MXD nylon (mass ratio) | Preliminary heated-water treatment vessel Temperature (° C.) | Preliminary heated-water treatment vessel Time (min) | Hot-water treatment vessel Temperature (° C.) | Hot-water treatment vessel Time (min) | Content of low molecular weight compounds (% by mass) | Thickness unevenness | Operability |
|---|---|---|---|---|---|---|---|---|---|
| Example 1 | Blend | 80/20 | 60 | 1 | 90 | 1 | 0.09 | G | G |
| Example 2 | Blend | 80/20 | 60 | 1 | 90 | 5 | 0.03 | G | G |
| Example 3 | Blend | 80/20 | 60 | 1 | 90 | 10 | 0.01 | G | G |
| Example 4 | Blend | 80/20 | 60 | 1 | 70 | 1 | 0.19 | G | G |
| Example 5 | Blend | 80/20 | 60 | 5 | 90 | 1 | 0.08 | G | G |
| Example 6 | Blend | 80/20 | 60 | 10 | 90 | 1 | 0.08 | G | G |
| Example 7 | Blend | 80/20 | 40 | 1 | 90 | 1 | 0.13 | G | G |
| Example 8 | Blend | 80/20 | 69 | 3 | 80 | 1 | 0.11 | G | G |
| Example 9 | Blend | 90/10 | 60 | 1 | 90 | 1 | 0.06 | G | G |
| Example 10 | Blend | 60/40 | 50 | 3 | 70 | 5 | 0.15 | G | G |
| Example 11 | Multilayer | 95/55 | 60 | 1 | 90 | 5 | 0.10 | G | G |
| Comparative Example 1 | Blend | 80/20 | 60 | 1 | 90 | 0.5 | 0.23 | G | G |
| Comparative Example 2 | Blend | 80/20 | 60 | 1 | 90 | 15 | 0.01 | G | P |
| Comparative Example 3 | Blend | 80/20 | 60 | 1 | 60 | 5 | 0.30 | G | G |
| Comparative Example 4 | Blend | 80/20 | 60 | 20 | 90 | 1 | 0.08 | G | P |
| Comparative Example 5 | Blend | 80/20 | 30 | 5 | 90 | 1 | 0.23 | A | P |
| Comparative Example 6 | Blend | 80/20 | 80 | 1 | 90 | 1 | 0.11 | P | P |
| Comparative Example 7 | Blend | 80/20 | — | — | 90 | 1 | — | — | P |
| Comparative Example 8 | Multilayer | 95/55 | 70 | 1 | — | — | 0.39 | G | G |

As shown in Table 1, in the biaxially stretched polyamide resin film of Example 1, the content of the low molecular weight compounds was found to be small.

The low molecular weight compounds extracted from the film were analyzed by infrared spectrometry (Perkin Elmer System 2000, KBr method) and nuclear magnetic resonance spectrometry (JEOL, Lambda 300WB NMR, $^1$H), and consequently the peaks originating from meta-xylylenediamine as a constituent molecule of nylon MXD were observed. On the basis of mass spectrometry (GC-MS, UA5-30M-0.25F, helium gas: 1.0 ml/min, split ratio: 30:1, 70→320° C., mass range: 5 to 500), a plurality of molecular weights in a range from 50 to 300 were observed. From the above-described results, the low molecular weight compound components were interpreted to be composed of plural types of low molecular weight compounds including meta-xylylenediamine originating from nylon MXD as well as caprolactam and the cyclic dimer originating from nylon 6.

Example 2

The hot-water treatment time was set at 5 minutes. Otherwise in the same manner as in Example 1, a biaxially stretched polyamide resin film was obtained. The content of the low molecular weight compounds, the thickness unevenness and the operability of the obtained biaxially stretched polyamide resin film were evaluated, and the results thus obtained are shown in Table 1.

Example 3

The hot-water treatment time was set at 10 minutes. Otherwise in the same manner as in Example 1, a biaxially stretched polyamide resin film was obtained. The content of the low molecular weight compounds, the thickness unevenness and the operability of the obtained biaxially stretched polyamide resin film were evaluated, and the results thus obtained are shown in Table 1.

Example 4

The hot-water treatment temperature was set at 70° C. Otherwise in the same manner as in Example 1, a biaxially stretched polyamide resin film was obtained. The content of the low molecular weight compounds, the thickness unevenness and the operability of the obtained biaxially stretched polyamide resin film were evaluated, and the results thus obtained are shown in Table 1.

Example 5

The preliminary heated-water treatment time was set at 5 minutes. Otherwise in the same manner as in Example 1, a biaxially stretched polyamide resin film was obtained. The content of the low molecular weight compounds, the thickness unevenness and the operability of the obtained biaxially stretched polyamide resin film were evaluated, and the results thus obtained are shown in Table 1.

Example 6

The preliminary heated-water treatment time was set at 10 minutes. Otherwise in the same manner as in Example 1, a biaxially stretched polyamide resin film was obtained. The content of the low molecular weight compounds, the thickness unevenness and the operability of the obtained biaxially stretched polyamide resin film were evaluated, and the results thus obtained are shown in Table 1.

Example 7

The preliminary heated-water treatment temperature was set at 40° C. Otherwise in the same manner as in Example 1, a biaxially stretched polyamide resin film was obtained. The content of the low molecular weight compounds, the thickness unevenness and the operability of the obtained biaxially stretched polyamide resin film were evaluated, and the results thus obtained are shown in Table 1.

Example 8

The preliminary heated-water treatment was performed at 69° C. for 3 minutes and the hot-water treatment was performed at 80° C. for 1 minute. Otherwise in the same manner as in Example 1, a biaxially stretched polyamide resin film was obtained. The content of the low molecular weight compounds, the thickness unevenness and the operability of the obtained biaxially stretched polyamide resin film were evaluated, and the results thus obtained are shown in Table 1.

Example 9

The mass ratio of nylon 6 resin chip/nylon MXD resin chip was set at 90/10. Otherwise in the same manner as in Example 1, a biaxially stretched polyamide resin film was obtained. The content of the low molecular weight compounds, the thickness unevenness and the operability of the obtained biaxially stretched polyamide resin film were evaluated, and the results thus obtained are shown in Table 1.

Example 10

The nylon 6 resin chip and the nylon MXD resin chip were mixed with each other in a mass ratio of nylon 6 resin chip/nylon MXD resin chip=60/40. The preliminary heated-water treatment was performed at 50° C. for 3 minutes and the hot-water treatment was performed at 70° C. for 5 minutes. Otherwise in the same manner as in Example 1, a biaxially stretched polyamide resin film was obtained. The content of the low molecular weight compounds, the thickness unevenness and the operability of the obtained biaxially stretched polyamide resin film were evaluated, and the results thus obtained are shown in Table 1.

Example 11

By using a five-layer coextrusion T-die, from an extruder, nylon 6, nylon MXD and a mixture of nylon 6 and nylon MXD in equal amounts were each melt-extruded, and were laminated in the order of nylon 6/mixture in equal amounts/nylon MXD/mixture in equal amounts/nylon 6. The laminated product was brought into close contact to the surface of a cooling drum regulated at a surface temperature of 20° C. to be rapidly cooled, and thus a 150-μm thick unstretched multilayer sheet was obtained.

Next, in the same manner as in Example 2, a 15-μm thick five-layer-configuration biaxially stretched polyamide resin film was obtained. The thickness configuration of the five-layer film was 4.5/0.5/5.0/0.5/4.5 [μm]. The content ratio between nylon 6 and nylon MXD in the five-layer film in terms of mass ratio was 95/55. The content of the low molecular weight compounds, the thickness unevenness and the operability of the obtained biaxially stretched polyamide resin film were evaluated, and the results thus obtained are shown in Table 1.

Comparative Example 1

As compared to Example 1, the hot-water treatment time was set at 0.5 minute. Otherwise, Comparative Example 1 was the same as Example 1. The content of the low molecular weight compounds, the thickness unevenness and the operability of the obtained biaxially stretched polyamide resin film were evaluated, and the results thus obtained are shown in Table 1.

Due to the too short time in the low molecular weight compound removal step, the content of the low molecular weight compounds in the obtained stretched film was large.

Comparative Example 2

As compared to Example 3, the hot-water treatment time was extended to be 15 minutes. Otherwise, Comparative Example 2 was the same as Example 3. The content of the low molecular weight compounds, the thickness unevenness and the operability of the obtained biaxially stretched polyamide resin film were evaluated, and the results thus obtained are shown in Table 1.

Although the hot-water treatment time was extended, the content of the low molecular weight compounds was not significantly improved, and due to the extended hot-water treatment time, the production efficiency was decreased.

Comparative Example 3

As compared to Example 2, the hot-water treatment temperature was set to be as low as 60° C. Otherwise, Comparative Example 3 was the same as Example 2. The content of the low molecular weight compounds, the thickness unevenness and the operability of the obtained biaxially stretched polyamide resin film were evaluated, and the results thus obtained are shown in Table 1.

Due to the too low water temperature in the hot-water treatment step, the content of the low molecular weight compounds was large.

Comparative Example 4

As compared to Example 1, the preliminary heated-water treatment time was set at 20 minutes. Otherwise, Comparative Example 4 was the same as Example 1. The content of the low molecular weight compounds, the thickness unevenness and the operability of the obtained biaxially stretched polyamide resin film were evaluated, and the results thus obtained are shown in Table 1.

Although the preliminary heated-water treatment time was extended, the content of the low molecular weight compounds was only slightly decreased. Additionally, due to the extended preliminary heated-water treatment time, the operability was degraded and the production efficiency was remarkably decreased.

Comparative Example 5

As compared to Example 5, the preliminary heated-water treatment temperature was set at 30° C. Otherwise, Comparative Example 5 was the same as Example 5. The content of the low molecular weight compounds, the thickness unevenness and the operability of the obtained biaxially stretched polyamide resin film were evaluated, and the results thus obtained are shown in Table 1.

Due to the too low water temperature in the preliminary heated-water treatment, the obtained stretched film underwent wrinkling at a large number of positions to cause the thickness unevenness, and the operability was remarkably degraded. Additionally, the low molecular weight compounds were not able to be sufficiently removed.

Comparative Example 6

As compared to Example 1, the preliminary heated-water treatment temperature was set at 80° C. Otherwise, Comparative Example 6 was the same as Example 1. The content of the low molecular weight compounds, the thickness unevenness and the operability of the obtained biaxially stretched polyamide resin film were evaluated, and the results thus obtained are shown in Table 1.

Due to the too high water temperature in the preliminary heated-water treatment, the obtained stretched film underwent wrinkling at a large number of positions and hence the film was not able to be produced stably.

Comparative Example 7

As compared to Example 1, the preliminary heated-water treatment step was omitted. Otherwise, Comparative Example 7 was the same as Example 1. The content of the low molecular weight compounds, the thickness unevenness and the operability of the obtained biaxially stretched polyamide resin film were evaluated, and the results thus obtained are shown in Table 1.

Due to the omission of the preliminary heated-water treatment step, the film underwent wrinkling to cause nonuniform stretching, and the film was not able to be produced stably.

Comparative Example 8

As compared to Example 11, the low molecular weight compound removal step in the second heated-water vessel was omitted, and the water temperature in the preliminary heated-water treatment step in the first heated-water vessel was set at 70° C. Otherwise, Comparative Example 8 was the same as Example 11. The content of the low molecular weight compounds, the thickness unevenness and the operability of the obtained biaxially stretched polyamide resin film were evaluated, and the results thus obtained are shown in Table 1.

Due to the omission of the hot-water treatment step as the low molecular weight compound removal step, the content of the low molecular weight compounds in the stretched film was high.

The invention claimed is:

1. A biaxially stretched polyamide resin film comprising:
   as a first component, nylon 6; and
   as a second component, a polyamide obtained by polymerization of xylylenediamine and an aliphatic dicarboxylic acid having 4 to 12 carbon atoms,
   wherein the composition ratio between the first component and the second component (first component/second component) is 90/10 to 60/40 in terms of mass ratio, and
   the content of low molecular weight compounds containing meta-xylylenediamine comprised in the biaxially stretched polyamide resin film is from 0% by mass to 0.2% by mass.

2. A process for producing a biaxially stretched polyamide resin film, the process comprising:
   forming an unstretched film comprising as a first component, nylon 6, and as a second component, a polyamide obtained by polymerization of xylylenediamine and an aliphatic dicarboxylic acid having 4 to 12 carbon atoms;
   obtaining a biaxially-stretched film by longitudinally stretching the unstretched film and then transversely stretching the longitudinally-stretched film or by simultaneous-biaxially stretching the unstretched film,
   wherein at a stage of forming the unstretched film, a stage after the longitudinal stretching, or a stage after the biaxial stretching, the film is brought into contact with water set at 40° C. or higher and lower than 70° C. for 1 to 10 minutes and further with water set at 70° C. or higher for 1 to 10 minutes.

* * * * *